(No Model.)

I. M. SWEET.
GEARING FOR CHANGING SPEED.

No. 363,776. Patented May 24, 1887.

WITNESSES,
James W. Williams
Harmon S. Babcock

INVENTOR,
Isaac M. Sweet

UNITED STATES PATENT OFFICE.

ISAAC M. SWEET, OF PROVIDENCE, RHODE ISLAND, ASSIGNOR OF ONE-HALF TO DEXTER B. POTTER, OF SAME PLACE.

GEARING FOR CHANGING SPEED.

SPECIFICATION forming part of Letters Patent No. 363,776, dated May 24, 1887.

Application filed October 22, 1886. Serial No. 216,976. (No model.)

*To all whom it may concern:*

Be it known that I, ISAAC M. SWEET, a citizen of the United States, residing in the city and county of Providence, State of Rhode Island, have invented a new and useful Gearing for Changing Speed, for the increase or decrease of speed, and to be applied to any kind of machinery for that purpose, the said changeable gear being placed between the point giving the power to the machine to be operated and the point receiving it, and forming at the same time a part of the operating-gears of the machine, of which the following is a specification.

My invention relates to improvements in the use of gear-wheels in combination, two of which may be increased or decreased in size and their relative positions changed, as and for the purposes hereinafter specified.

Figure 2:
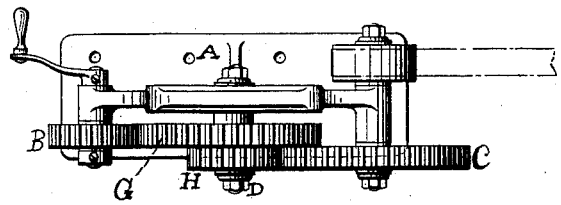
Figures 1, 3:
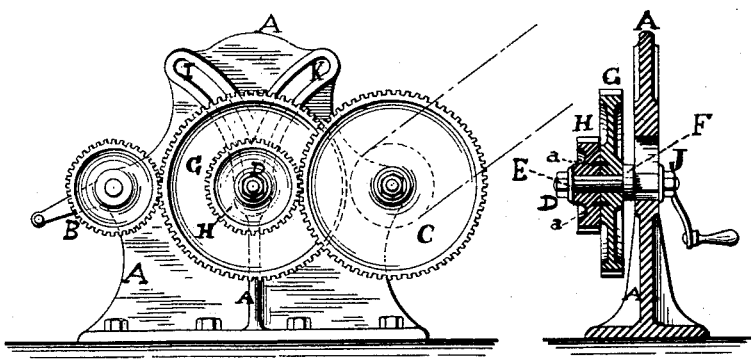
Figure 4:
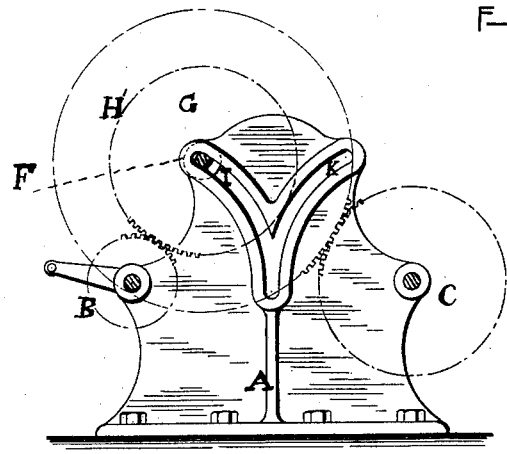
Figure 5:
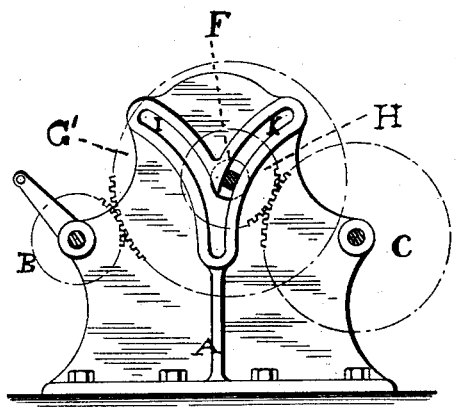

Figure 1 is a front elevation of my invention; Fig. 2, a top view of the same; Fig. 3, a central vertical section. Figs. 4 and 5 show the manner of increasing and decreasing the speed.

Like letters refer to like parts throughout the several views.

The standard A constitutes the frame of the machine. G and H are gear-wheels, which are removable and which are changed in order to increase or decrease the speed. The gear B, with crank attached, is the one from which the power is received.

The gear C is the one which receives the power from the two gears in combination, and by which arrangement the speed is increased or decreased without changing the size of the gears B or C and without changing the distance between the same two gears.

When it is desired to increase the speed of the gear C, and consequently of the machine to be operated, the nut D is removed; the gear H is removed from the stem or shaft E, Fig. 3; the nut J, Fig. 3, is loosened, and the stem or shaft having the shoulder F, Fig. 3, with the gear G still on the stem or shaft, is moved up the slot I; a larger gear, H', Fig. 4, is slipped upon the stem or shaft into place, meshing into gear C, and the two gears G and H' are then held as one gear by the pins $a\ a$, as seen in Fig. 3, and by the nut D, which is then set up, and the stem or shaft having the shoulder F, Fig. 3, is firmly held by the nut J, as shown in Fig. 3. The shoulder is also indicated in Figs. 4 and 5.

If it is desired to decrease the speed, as shown in Fig. 5, but not to so great an extent as it is increased in Fig. 4, as here shown, the gears G and H are both removed, the nut J, Fig. 3, being loosened. The shaft E, having a shoulder, F, is moved up the slot K instead of the slot I. The gear G, Fig. 1, is replaced by gear G', Fig. 5. Gear H is replaced, Figs. 1 and 5, and all secured in place, as above stated. In this way and by employing gears of different sizes, as described, the speed between two gears, (like B and C,) can be increased or diminished by one tooth only, or as may be desired, thereby also greatly increasing or decreasing the speed, as shown in Figs. 4 and 5. The same results can be obtained by using one upright stem with one slot instead of the frame with slots I and K, but having the upright stem with slot turn to the right or left upon a bolt at the point D in Fig. 1, and being secured by a set-nut.

Having fully described my invention, what I desire to claim and secure by Letters Patent is—

1. The standard A, having the slots I and K, in combination with the fixed gear-wheels B and C, mounted on said standard, and the adjustable shaft E, having shoulder F, said shaft being adapted to support the detachable gears G and H, respectively, substantially as and for the purpose specified.

2. The combination of the slotted standard A, gears B and C, and the adjustable shaft E, having shoulder F, said shaft adapted to support the gears G and H, fastened together by the pins $a\ a$, all arranged and operating substantially as described.

ISAAC M. SWEET.

Witnesses:
JAMES W. WILLIAMS,
HARMON S. BABCOCK.